(12) United States Patent
Rice et al.

(10) Patent No.: US 6,435,489 B1
(45) Date of Patent: Aug. 20, 2002

(54) BODY MOUNT HAVING INDEPENDENT VERTICAL AND LATERAL RATES

(75) Inventors: Bernie W. Rice, Thorndale; Edward Sayej, Stratford; Robert Bender, Wellesley, all of (CA)

(73) Assignee: Cooper Technology Services, LLC, Findlay, OH (US)

( * ) Notice: Subject to any disclaimer, the term of this patent is extended or adjusted under 35 U.S.C. 154(b) by 0 days.

(21) Appl. No.: 10/006,750

(22) Filed: Dec. 5, 2001

Related U.S. Application Data

(63) Continuation of application No. 09/256,445, filed on Feb. 23, 1999.

(51) Int. Cl.⁷ ................................................ F16M 1/00
(52) U.S. Cl. ................. 267/140.5; 248/635; 267/140.3
(58) Field of Search .......................... 267/136, 140.13, 267/140.3, 141, 141.1, 141.4, 141.7, 140.5; 248/632, 633, 634, 635, 621; 296/35.1

(56) References Cited

U.S. PATENT DOCUMENTS

| | | |
|---|---|---|
| 1,871,963 A | 8/1932 | Dill |
| 2,208,709 A | 7/1940 | Tjaarda |
| 2,769,656 A | 11/1956 | Lee |
| 2,838,339 A | 6/1958 | Schaldenbrand |
| 2,926,881 A | 10/1960 | Painter |
| 2,976,080 A | 3/1961 | Moore |
| 3,159,391 A | 12/1964 | Wilfert et al. |
| 3,250,565 A | 5/1966 | Jaskowiak |
| 3,350,042 A | 10/1967 | Stewart et al. |
| 3,479,081 A | 11/1969 | Schaaf |
| 3,622,194 A | 11/1971 | Bryk |
| 3,809,427 A | 5/1974 | Bennett |
| 3,927,730 A | 12/1975 | Winslow |
| 3,990,737 A | 11/1976 | Palmer |
| 4,012,071 A | 3/1977 | Jones et al. |
| 4,014,588 A | 3/1977 | Kohriyama |
| 4,407,491 A | 10/1983 | Kunihiro et al. |
| 4,783,039 A | 11/1988 | Peterson et al. |
| 4,921,203 A | 5/1990 | Perterson et al. |
| 4,958,812 A | 9/1990 | Wolf et al. |
| 5,024,425 A | 6/1991 | Schwerdt |
| 5,103,529 A | 4/1992 | König |
| 5,121,905 A | 6/1992 | Mann et al. |
| 5,127,698 A | 7/1992 | König |
| 5,158,269 A | 10/1992 | Hein et al. |
| 5,170,985 A | 12/1992 | Killworth |
| 5,178,433 A | 1/1993 | Wagner |
| 5,248,134 A | 9/1993 | Ferguson et al. |
| 5,409,283 A | 4/1995 | Ban |
| 5,551,661 A | 9/1996 | Bunker |
| 5,580,028 A | 12/1996 | Tomczak et al. |
| 5,722,631 A | 3/1998 | Dorton |
| 5,743,509 A | 4/1998 | Kanda et al. |
| 5,746,411 A | 5/1998 | Bruas et al. |
| 6,030,016 A | 2/2000 | Rice |
| 6,105,944 A | 8/2000 | David |

Primary Examiner—Paul N. Dickson
Assistant Examiner—Melanie Torres
(74) Attorney, Agent, or Firm—Fay, Sharpe, Fagan, Minnich & McKee, LLP

(57) ABSTRACT

A body mount for coupling a vehicle body to a vehicle frame is disclosed. The body mount includes a first member disposed on one side of the frame. The first member includes an elastomeric member with a plurality of pads formed about the periphery of the first member for defining a side to side and a fore/aft cushioning rate. The body mount also includes a second member disposed on an opposite side of the frame and operably coupled to the first member.

19 Claims, 6 Drawing Sheets

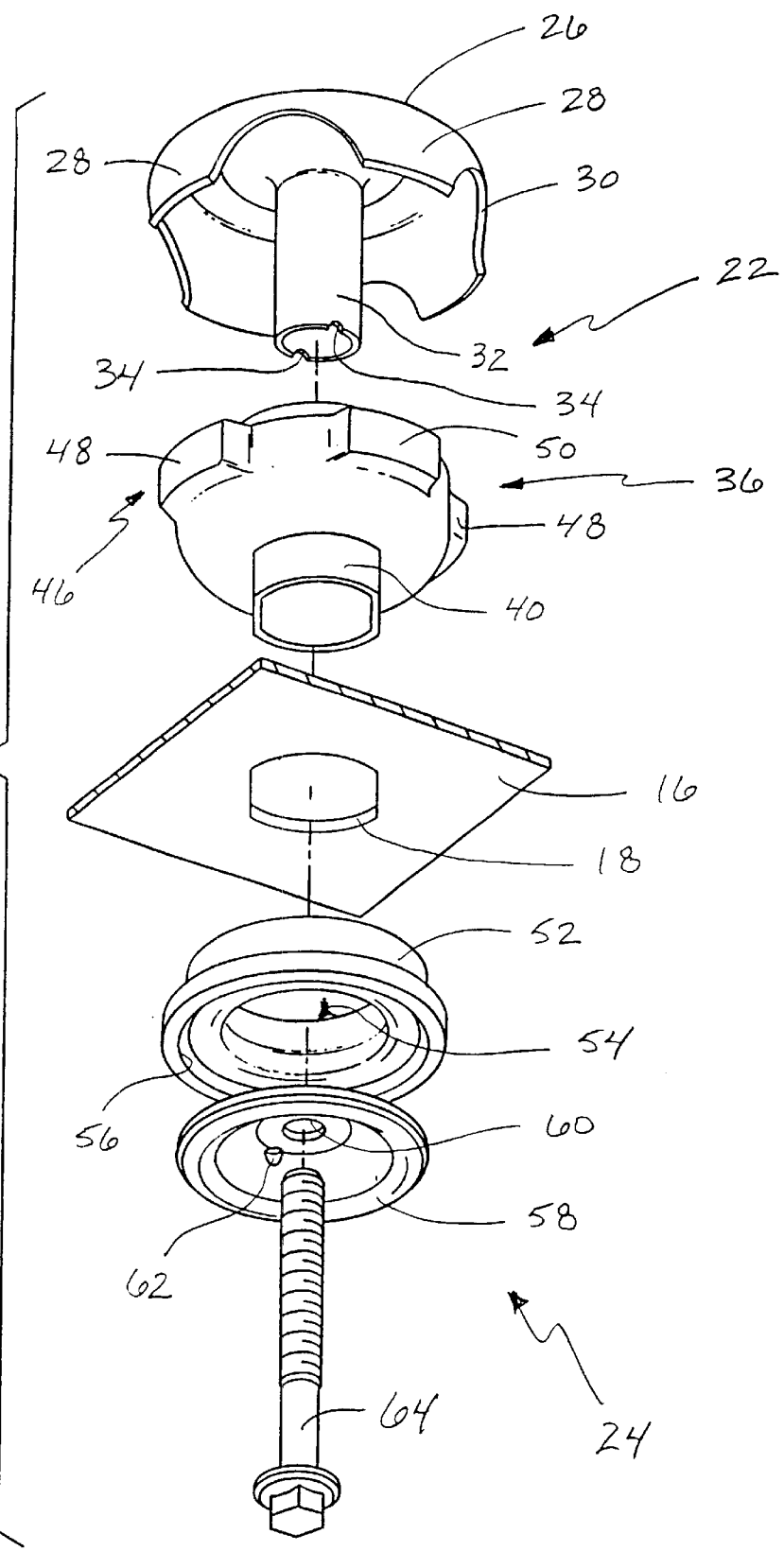

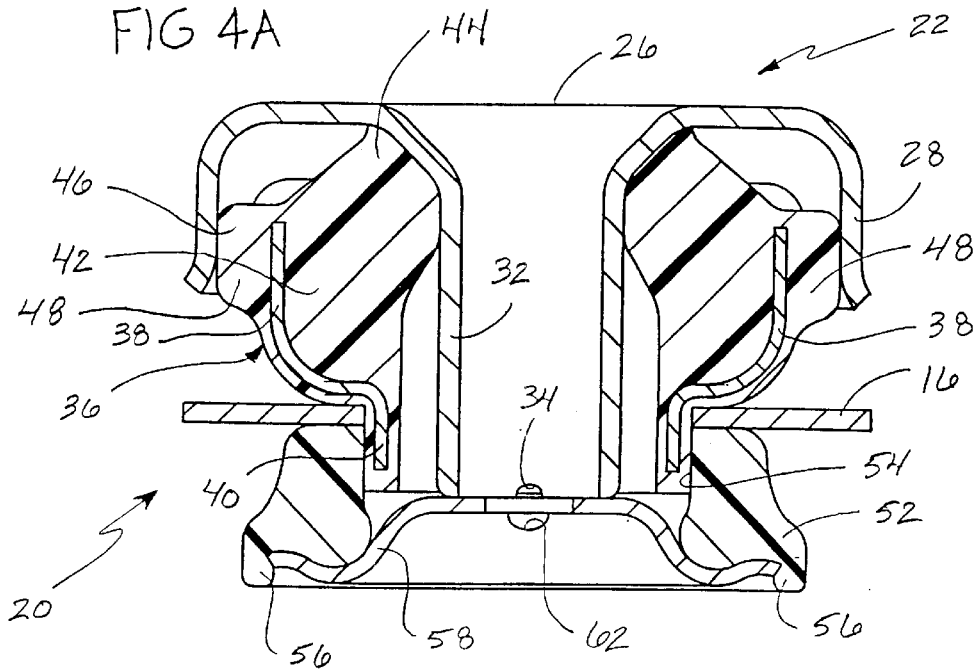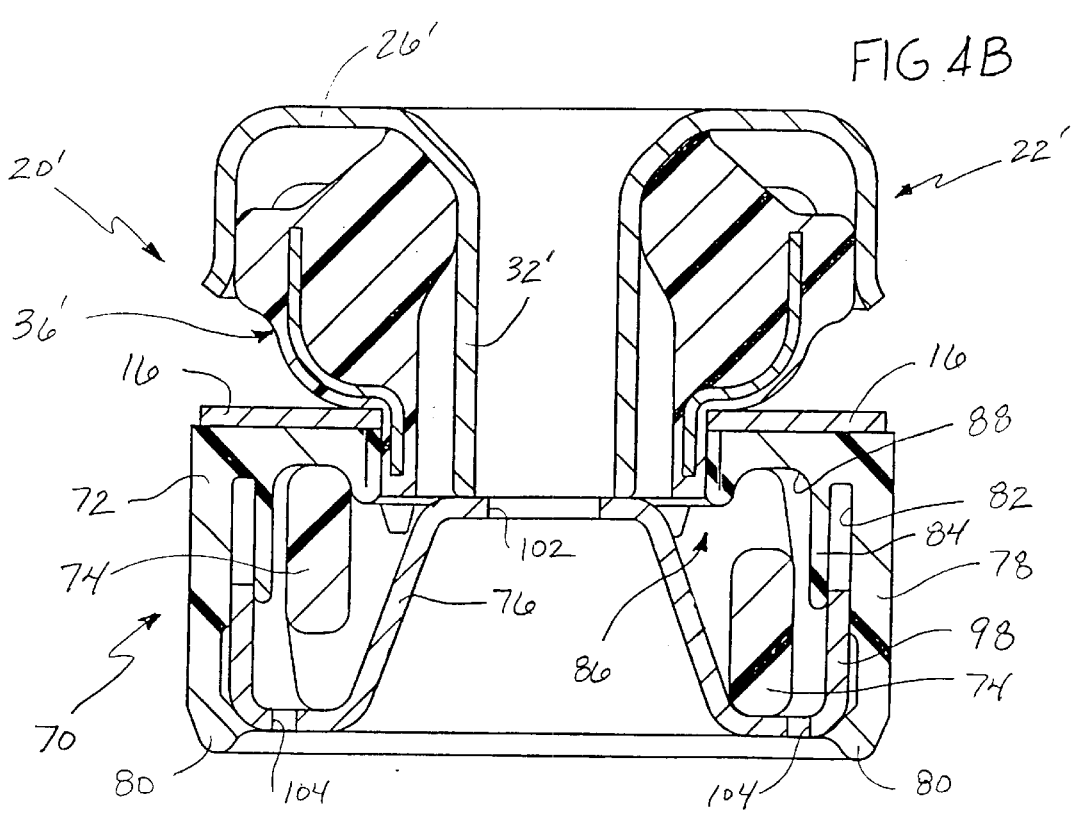

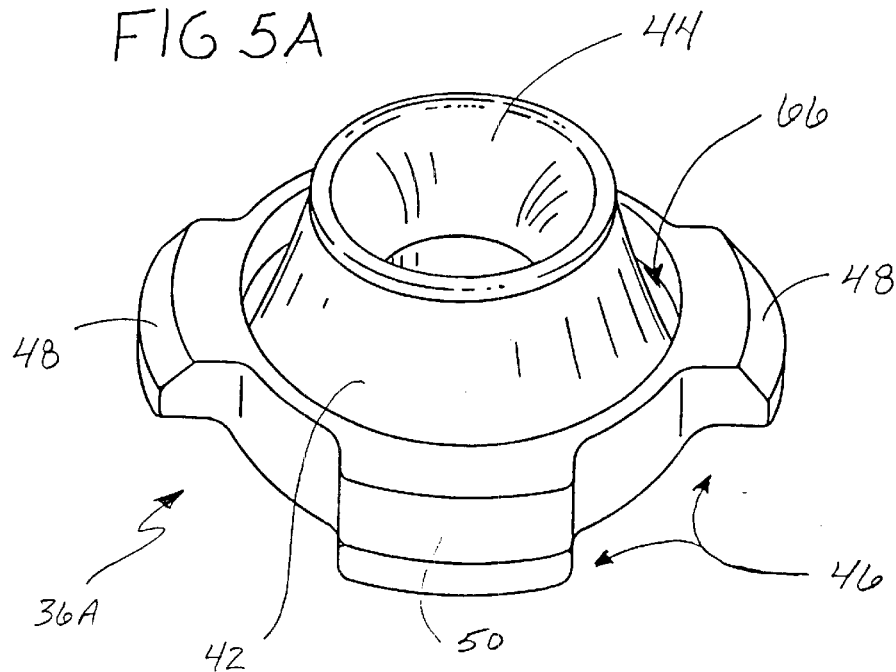
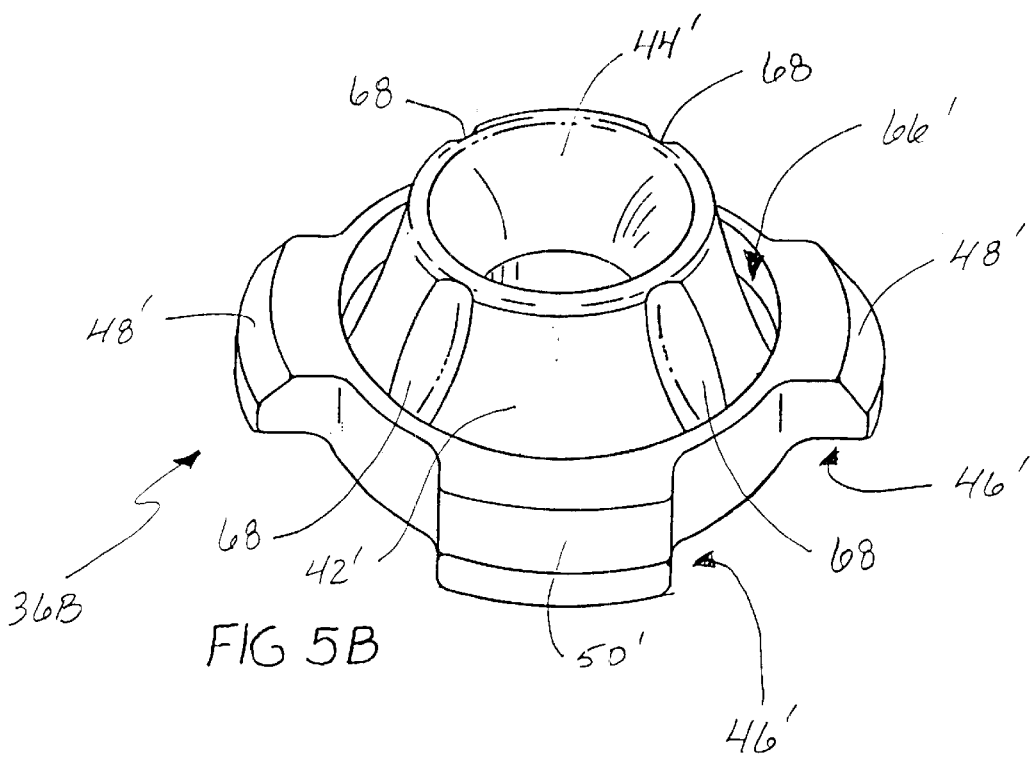

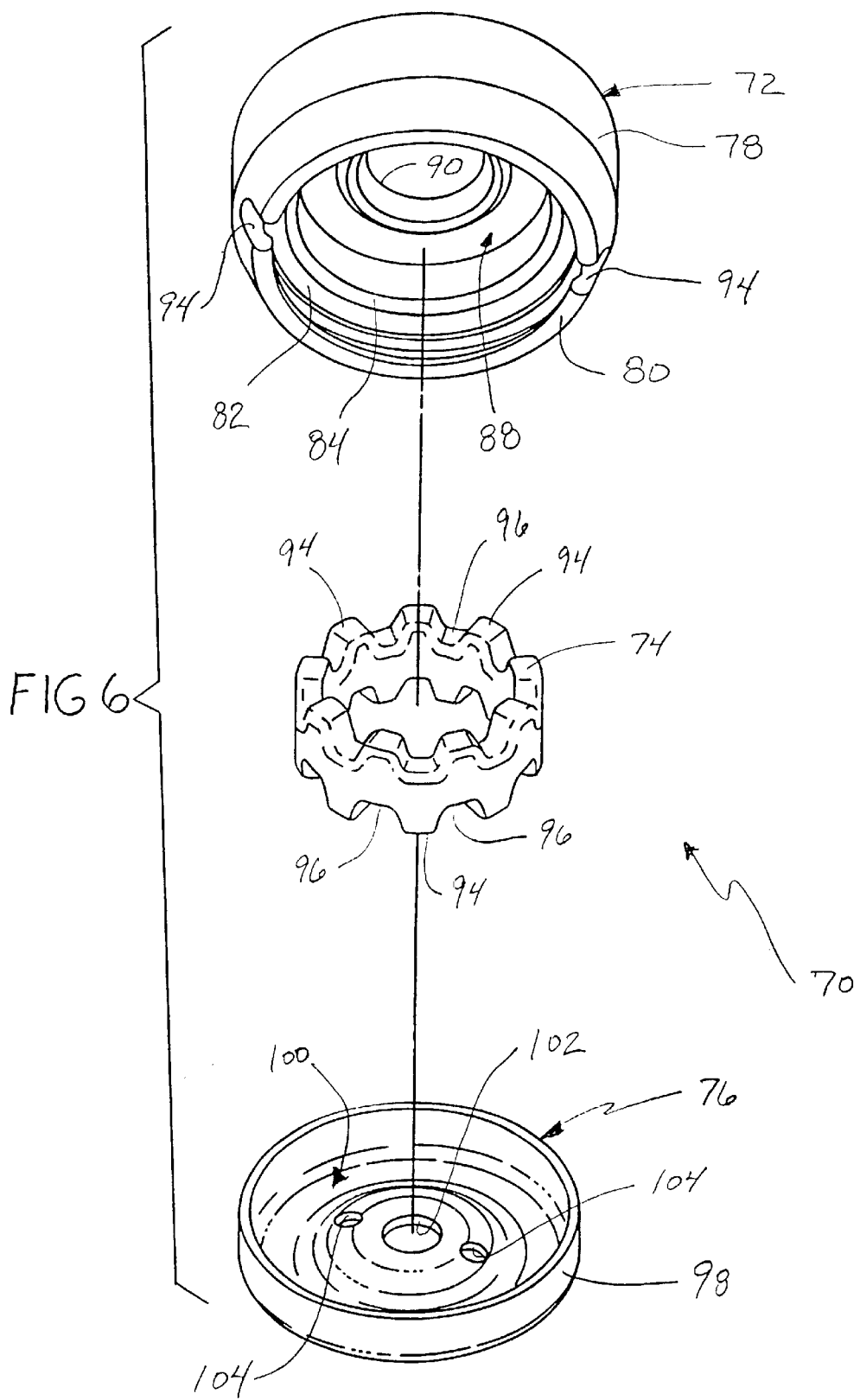

BODY MOUNT HAVING INDEPENDENT VERTICAL AND LATERAL RATES

This is a continuation of application Ser. No. 09/256,445 filed Feb. 23, 1999.

BACKGROUND OF THE INVENTION

1. Technical Field

The present invention is directed to a body mount for an automotive vehicle or truck. More particularly, the present invention is directed to a body mount in which the vertical cushioning rate may be independently tuned in relation to the lateral cushioning rate.

2. Discussion

Automotive vehicles, and especially trucks are typically equipped with a body mount disposed between the vehicle body and the vehicle frame. The body mount provides additional cushioning between the vehicle body and frame. The body mount also serves to isolate the transmission of vibration energy and impact energy from the vehicle suspension and frame up through the vehicle body.

A variety of body mounts have been developed for different types of vehicle applications. Most of these body mount designs include an elastomeric member which is captured by a support structure for securing the body mount between the body and frame. The elastomeric member may be formed from a variety of plastic or rubber materials.

One example of a simple compression style body mount is a circular or annular elastomeric member which is secured to one or more metal plates. The durometer of the elastomeric member can be chosen for tailoring the characteristics of the body mount. However, this compression style mount is stiff vertically and soft laterally; including both side to side and fore/aft lateral directions. A particular disadvantage of this simple body mount design is that it does not provide firm lateral support for the vehicle body with respect to the frame. Thus, the vehicle body is not restricted from moving in the side to side and fore/aft directions with respect to the frame. This soft lateral support allows excessive motion laterally with respect to the vehicle frame which results in poor shake control of the vehicle.

An additional disadvantage of this compression style body mount design is that it produces a firm vertical cushioning rate which absorbs less energy and provides a harsher ride. Moreover, this body mount design typically has a vertical to lateral cushioning rate ratio of approximately 3:1 (vertical:lateral), allows only minimal tuning of the vertical rate with respect to the lateral rate, and limited options for designing the vertical rate independently from the lateral rate. Another disadvantage with typical prior art body mount designs is that the lateral cushioning rate is constant about the circumference of the mount. Thus, the side to side vehicle cushioning rate is identical to the fore/aft vehicle cushioning rate. Accordingly, this type of mount provides limited design flexibility to a vehicle ride control engineer in designing the mount for use on a variety of vehicles.

In the design of vehicle suspension systems, it is becoming more common to require the body mount to have a soft vertical cushioning rate for enhancing ride comfort, and a firm lateral (meaning both side to side and fore/aft) cushioning rate for providing increased vehicle stability and control. However, this desired feature typically requires a body mount in which the vertical cushioning rate can be tuned or designed independently from the lateral cushioning rate.

In view of the disadvantages associated with the prior art body mount designs, it is desirable to provide a body mount which has a soft vertical cushioning rate and a firm lateral cushioning rate. It is further desirable to provide a body mount which has a vertical to lateral cushioning rate of 1:2, 1:3 or greater, while still maintaining a soft vertical rate. As an additional feature, it is desirable to provide a body mount which allows the fore/aft lateral rate to be designed to be firmer or softer than the side to side lateral rate (or vice versa). Finally, it is desirable to provide a body mount with a one-way orientation or alignment feature forcing the mount to always be installed in the correct orientation within the vehicle.

SUMMARY OF THE INVENTION

The present invention is directed to a body mount for coupling a vehicle body to a vehicle frame. The body mount includes a first member disposed on one side of the frame. The first member includes an elastomeric member having a plurality of pads formed about the periphery of the first member for defining a lateral cushioning rate. The body mount also includes a second member disposed on an opposite side of the frame and operably coupled to the first member. As part of the present invention, the second member functions as a rebound cushion for the body mount. A structural collar may be disposed between the elastomeric member and the plurality of pads. The first member allows a vertical cushioning rate defined by the elastomeric member to be designed and/or tuned independently from the lateral cushioning rate.

BRIEF DESCRIPTION OF THE DRAWINGS

The various advantages of the present invention will become apparent to one skilled in the art by reading the following specification and appended claims, and by referencing the following drawings in which:

FIG. 3 is an exploded perspective view of the body mount of the present invention;

FIG. 4A is a cross-sectional view of the body mount in accordance with a preferred embodiment of the present invention;

FIG. 4B is a cross-sectional view of the body mount including an alternate lower member assembly in accordance with the present invention;

FIG. 5A is a perspective view of the upper cushion in accordance with an alternate embodiment of the present invention;

FIG. 5B is a perspective view of the upper cushion in accordance with an alternate embodiment of the present invention;

FIG. 6 is an exploded perspective view of the components forming the alternate lower member assembly of the present invention;

DETAILED DESCRIPTION OF THE PREFERRED EMBODIMENTS

Figure 1:
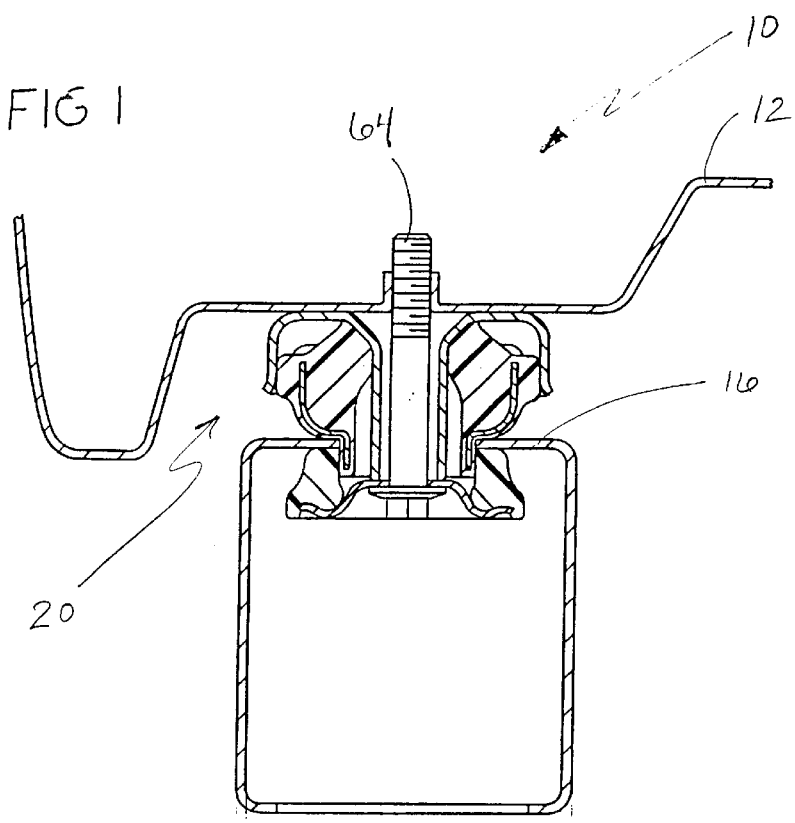
FIG. 1 is a cross-sectional view of an exemplary body on frame vehicle design utilizing the body mount of the present invention.

In accordance with the teachings of the present invention, a body mount having independent vertical and lateral cushion rates is disclosed. FIG. 1 illustrates an exemplary body on frame vehicle system 10 having a vehicle body 12 which is mounted to a vehicle frame 16 with a body mount 20. A suitable retaining bolt 64 secures the body mount 20 between the body 12 and the frame 16. The body mounts associated with the vehicle may have the same or different cushioning characteristics at different locations around the vehicle.

Figure 2:
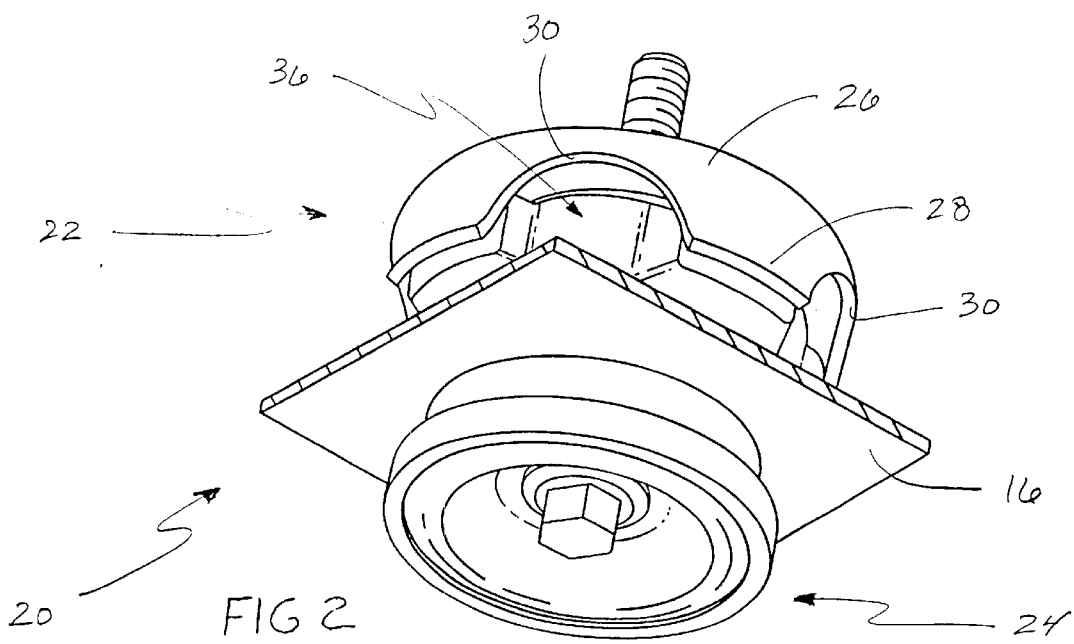
FIG. 2 is a perspective view of the body mount in accordance with a preferred embodiment of the present invention.

Referring now to FIGS. 2 and 3, the body mount 20 is shown according to a preferred embodiment of the present invention. The body mount 20 generally includes an upper member 22 and a lower member 24 which are disposed on opposite sides of the vehicle frame 16. The upper member 22 includes the helmet 26 which fits over and through the upper cushion assembly 36. The top portion of the helmet 26 is defined by four ears 28 having slightly flared ends, and four cutout portions 30. The combination of ears 28 and cut out portions 30 allows the helmet 26 to be efficiently stamped from a square steel blank. The cutout portions 30 also serve to reduce undesirable weight by eliminating unnecessary metal. The helmet 26 also includes an elliptical stem 32 which forms an aperture for accommodating the retaining bolt 64. The base of the stem 32 includes a pair of notches 34 which allow any water which collects within the stem 32 to properly drain through the body mount 20.

The upper cushion 36 is formed around a circular metal collar 38 having an elliptical base 40 which fits within a corresponding elliptical aperture 18 formed within the vehicle frame 16. This elliptical fit feature forces the mount to be installed in the correct orientation within the vehicle. An elastomeric inner cushion 42 is formed within the collar 38. The shape of the inner cushion 42 defines an upper cushion leg 44 which is designed for engaging the inner surface of the helmet 26 when the body mount 20 is assembled. A set of four outer pads 46 are formed about the outside circumference of the upper cushion 36. As disclosed, the outer pads 46 may be designed to include separately shaped opposing pairs of lateral pads 48 and fore/aft pads 50.

The metal collar 38 may also be formed to have a square or rectangular outer dimension, also preferably with an elliptical base. As part of this configuration, the helmet 26 is also formed to have a corresponding square or rectangular outer dimension, and the inner surface of the four ears 28 have a flat surface for engaging the square or rectangular upper cushion 36. A particular advantage of this alternate configuration is that a square or rectangular upper cushion 36 resists rotating with respect to a corresponding square or rectangular helmet 26.

During the manufacturing of the upper cushion 36, the metal collar 38 is coated with an adhesive material. The elastomeric material forming the inner cushion 42 and the outer pads 46 is then molded around the collar 38 into the desired size and shape. The adhesive material serves to permanently bond the elastomeric material to the collar 38. The preferred method for forming the upper cushion 36 is through high pressure injection molding. However, it should be understood that other molding processes, such as transfer or compression molding processes can also be employed for forming the elastomeric components of the body mount. As part of the present invention, it is also contemplated that two different types or durometer of rubber or elastomeric material can be used for forming the upper cushion 36 and thus designing its dynamic properties. Alternatively, it is possible to mold the inner cushion 42 separately from the metal collar 38 and outer pads 46, and then sub-assemble these components after molding. This technique easily allows two different types or durometer of rubber or elastomeric material to be employed for the inner cushion 42 and the outer pads 46, allowing increased tuning flexibility.

The lower member 24 of the body mount 20 includes a rebound cushion 52 and a clamp disk 58. The rebound cushion 52 has a complimentary elliptical aperture 54 in the top portion thereof for receiving the elliptical base 40 of the metal collar 38. The preferred elastomeric material for the rebound cushion 52 is natural rubber or butyl. However, a variety of elastomeric materials can be used for the rebound cushion 52. An annular lip 56 is molded into the bottom of the rebound cushion 52 which allows the clamp disk 58 to be snapped into position and retained by the rebound cushion 52. As shown, the clamp disk 58 includes a central aperture 60 for receiving a suitable body mount fastener 64. The clamp disk 58 also includes an opposing pair of drain holes 62 for allowing any water collecting within the center of the body mount 20, or water draining through notches 34 to properly drain.

Turning now to FIG. 4A, the specific details associated with the upper member 22 and the lower member 24 of the body mount 20 are disclosed. The vertical and lateral cushion rates of the body mount 20 are primarily controlled through the upper member 22 and the shape of the upper cushion 36. The preferred elastomeric material for the upper cushion 36 is butyl. However, natural rubber is also suitable for this application. The vertical cushion rate can be varied by changing the size and shape of the inner cushion 42 and the cushion leg 44. The side to side and fore/aft components of the lateral cushion rate can be independently varied by changing the size and shape of the outer pads 46.

FIG. 4A also shows that the outer pads 46 become pre-compressed between the collar 38 and ears 28 when the helmet 26 is fitted over the upper cushion 36. Also shown is that the cushion leg 44 is pre-compressed through its contact with the inner surface of the helmet 26. As part of the present invention, the dimensions of the outer pads 46 can be varied in order to change the amount of pre-compression of the elastomeric material disposed between the collar 38 and the helmet ears 28. As t he distance between the collar 38 and the ears 28 is generally fixed, a wider or larger pad 46 will produce more pre-compression, and thus a firmer cushion rate. A narrower or smaller pad 46 will produce less pre-compression, and thus a softer cushion rate. Additionally, it is contemplated that the opposing pair of lateral pads 48 may have different dimensions than the opposing pair of fore/aft pads 50, and therefore a different amount of pre-compression.

In a similar fashion, the size and shape of the inner cushion 42 and the cushion leg 44 can be designed for controlling the vertical rate of the mount. A larger cushion leg 44 will produce a firmer vertical cushion rate. A smaller cushion leg 44 will produce a softer vertical cushion rate. Additionally, the angle of the cushion leg 44 relative to the vehicle frame 16 can also be used to control the vertical cushion rate. As the angle with respect to the vehicle frame 16 increases, the vertical cushion rate also increases. As will be appreciated by one skilled in the art, these features of the outer pads 46 and the cushion leg 44 allow the lateral cushion rate of the body mount 20 to be designed or tuned independently from the vertical cushion rate. The design of the outer pads 46 can also be varied so that the side to side lateral cushion rate can be different than the fore/aft lateral cushion rate.

FIG. 4B discloses an alternate design of the body mount of the present invention. Specifically, body mount 20' includes an upper member assembly 22' which is substantially similar to upper member assembly 22. The helmet 26' and upper cushion 36' can also accommodate the design of the lower member assembly 70 according to an alternate preferred embodiment of the present invention. As shown in FIGS. 4B and 6, the lower member assembly 70 generally includes a lower rebound cushion 72, an inner cushion 74, and a clamp disk 76 which can be pre-assembled as a unitary component prior to installation on the vehicle. As will be appreciated, the clamp disk 76 and its central body can take on a variety of configurations for engaging and aligning with the helmet stem 32'.

With reference to FIGS. 5A–5B, perspective views of upper cushions 36A and 36B are shown. The outer pads 46 of the upper cushions 36A, 36B are shown to have identical dimensions. However, as described above, pads 48 can have dimensions which are different from pads 50 for altering the lateral cushion rates. A particular feature of the upper cushion 36A of FIG. 5A is that a portion of the elastomeric material, shown generally at 66, forming the inner cushion 42 may be selectively removed. Additionally, as shown in FIG. 5B, four vertical grooves 68 may be cut, machined or molded into the remaining portion of the inner cushion 42' and the cushion leg 44'. Preferably, the vertical grooves 68 are formed between the outer pads 46' as shown. FIG. 5B also shows that a portion of the elastomeric material, shown at 66', is also removed for tuning the vertical cushion rate. While not specifically shown, grooves 68 may take on a variety of shapes, including but not limited to, removing enough material for forming an aperture through the inner cushion 42' and into the central aperture of the upper cushion 36'.

The purpose of these modifications is to remove a predetermined amount of the elastomeric material from the portion of the upper cushion 36' which defines the vertical cushioning rate. As will be appreciated, this modification will produce an upper cushion 36' and body mount 20 with a softer vertical rate. However, this modification will not affect the lateral cushioning rate because the outer pads 46' are substantially isolated from the remaining elastomeric material of the inner cushion 42' by the metal collar 38.

Figure 7:
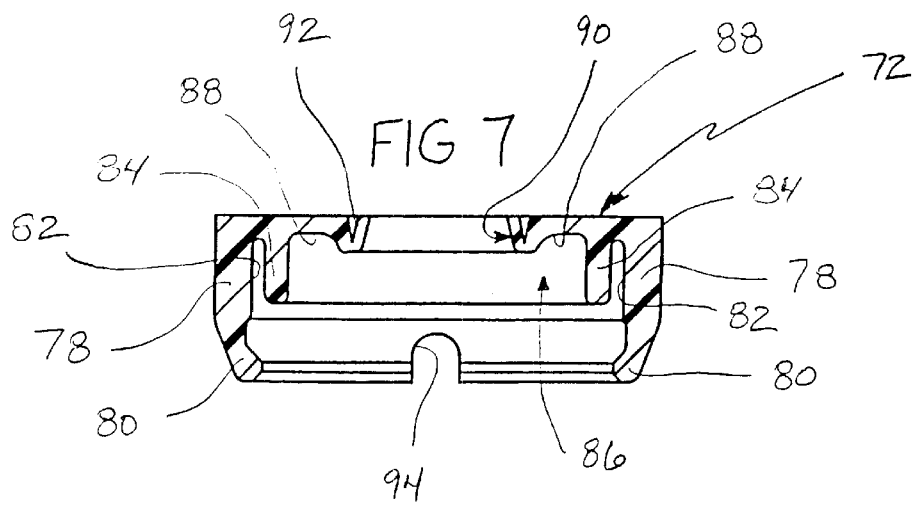
FIG. 7 is a cross-sectional view of the rebound cushion associated with the lower member assembly of FIG. 6.
Figure 8:
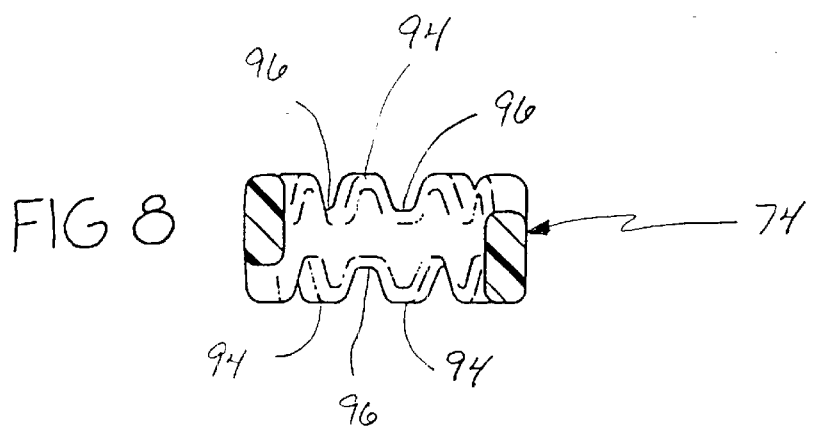
FIG. 8 is a cross-sectional view of the inner cushion associated with the lower member assembly of FIG. 6.
Figure 9:
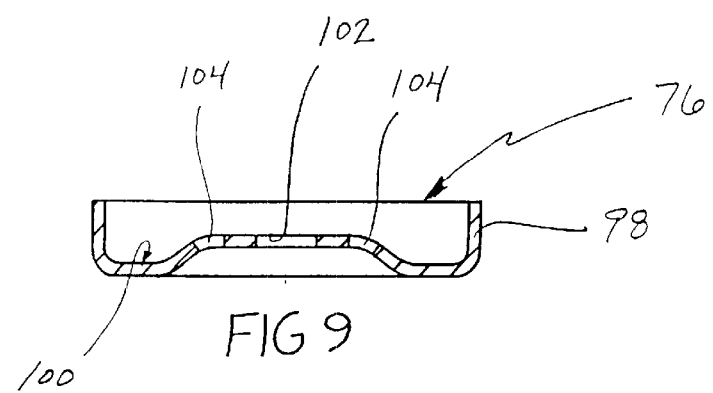
FIG. 9 is a cross-sectional view of the clamp disk associated with the lower member assembly of FIG. 6.

The individual components forming the lower member assembly 70 associated with an alternate preferred embodiment of the present invention are shown in FIGS. 7–9. More specifically, FIG. 7 discloses a cross-sectional view of the rebound cushion 72, which is also preferably injection molded from an elastomeric material such as a thermoplastic elastomer, natural rubber, EPDM or butyl. The structure of the rebound cushion 72 is defined by an outer wall 78. An annular lip 80 is molded into the bottom of the outer wall 78 which allows the clamp disk 76 to be snapped into position and retained within the outer wall 78 of the lower rebound cushion 72.

Through the injection molding process or a similar process, an outer channel 82 is formed between a molded inner wall 84 and the outer wall 78 of the rebound cushion 72. As shown, the diameter of the annular lip 80 is less than that of the outer channel 82. The molded inner wall 84 is also annular in shape, and forms a cylindrical inner cavity 86. An inner channel 88 is also molded into the body of the rebound cushion 72. The combination of the inner cavity 86 and the inner channel 88 function to maintain the inner cushion 74 in an optimal position.

A central aperture 90 which may be circular or elliptical in shape is formed through the body of the rebound cushion 72 for receiving the base 40 of a suitably designed upper cushion 36. An annular groove 92 is molded around the outer circumference of the central aperture 90. The annular groove 92 functions to locate or seat the inner cushion 74. A cutout 94 is formed in the outer wall 78 of the rebound cushion 72. The cutout 94 functions to reduce the required effort to insert the clamp disk 76.

The particular features of the inner cushion 74 associated with the lower member assembly 70 are shown in cross section in FIG. 8. The annular body of the inner cushion 74 includes alternating support ridges 94 and V-shaped notches 96 formed along the top and bottom surfaces. As shown, each support ridge 94 is disposed directly opposite a corresponding notch 96. The alignment of the support ridges 94 and notches 96 functions to allow the inner cushion 74 to be compressed to approximately one half its full height during the rebound stroke of the body mount 20'. It is preferred that the elastomeric material used for the inner cushion 74 is selected to have a durometer which is softer than the durometer of the elastomeric material forming the rebound cushion 72. This feature assists in producing a soft vertical cushioning rate. The inner cushion 74 is dimensioned to fit within the inner cavity 86 of the rebound cushion 72 yet still provide room to bulge and expand. The design of the inner cushion 74 can take on a variety of forms and is not limited to the disclosed shape or description herein, as the purpose of the inner cushion 74 is to provide a cushion which produces a soft vertical cushion rate.

The inner cushion 74 is retained within the rebound cushion 72 by the metal clamp disk 76 having its outside diameter defined by an annular wall 98. During the stamping process, an annular channel 100 is formed within the clamp disk 76 which assists the inner cushion 74 in maintaining its proper shape during compression. A central aperture 102 is also formed within the clamp disk 76 for receiving a suitable body mount fastener 64. The clamp disk 76 also includes a pair of opposing drain holes 104 for allowing any water collecting within the center of the body mount 20' to properly drain. As will be appreciated, the clamp disk 76 can take on a variety of configurations for aligning the inner cushion 74, and engaging and aligning with the helmet stem 32'.

The complete assembly of body mount 20', including the lower member assembly 70 is shown in FIG. 4B. As will be appreciated, the lower member assembly 70 provides a firm lateral cushion rate due in part because the rebound cushion 72 has a stiff outer wall 78 for resisting the lateral movements of the clamp disk 76. Additionally, the lower member assembly 70 provides a soft vertical cushion rate because of the lower compression resistance provided by the softer durometer of the inner cushion 74, and because the annular wall 98 of the clamp disk 76 is able to move vertically within the outer channel 82 of the rebound cushion 72. Thus, the features of body mount 20' also allow the vertical cushioning rate to be higher than the lateral cushioning rate.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A body mount for coupling a vehicle body to a vehicle frame comprising:

a first member disposed on one side of the frame, the first member having an elastomeric member with a plurality of pads extending from a periphery thereof over only a portion of a total height of the elastomeric member for defining a lateral cushioning rate; and a second member disposed on an opposite side of the frame and operably coupled to the first member.

2. The body mount of claim 1 wherein the first member includes an elliptical base which is adapted to fit within a complementary elliptical aperture formed within the vehicle frame such that the body mount is capable of being secured to the vehicle frame in a predetermined orientation.

3. The body mount of claim 1 wherein the first member includes a metal helmet fitted over the first member for contacting the plurality of pads and pre-compressing the elastomeric member.

4. The body mount of claim 3 wherein the plurality of pads are precompressed by the helmet in a radial direction.

5. The body mount of claim 3 wherein the elastomeric member includes a cushion leg for contacting an inside surface of the metal helmet for defining a vertical cushioning rate.

6. The body mount of claim 5 wherein the cushion leg includes a contoured portion for altering the vertical cushioning rate.

7. The body mount of claim 5 wherein the cushion leg is pre-compressed by the metal helmet.

8. The body mount of claim 5 wherein the first member includes a structural collar for isolating the cushion leg from the plurality of pads.

9. The body mount of claim 1 wherein the second member is an elastomeric rebound cushion.

10. A body mount for coupling a vehicle body to a vehicle frame comprising:

a first member disposed on one side of the frame, the first member having an elastomeric member with a first pair of elastomeric pads for defining a side to side lateral cushioning rate and a second pair of elastomeric pads for defining a fore and aft lateral cushioning rate;

a helmet fitted over the first member for contacting the first and second pairs of elastomeric pads over substantially an entire height of the pairs of pads and radially pre-compressing the elastomeric member; and a second member disposed on an opposite side of the frame and operably coupled to the first member.

11. The body mount of claim 10 wherein the first member includes a structural collar having a base for engaging a corresponding aperture formed within the vehicle frame.

12. The body mount of claim 11 wherein the first member includes an inner cushion disposed within the structural collar.

13. The body mount of claim 12 wherein the inner cushion has a cushion leg for contacting an inside surface of the metal helmet, the cushion leg defining a vertical cushioning rate of the body mount.

14. The body mount of claim 11 wherein the structural collar is generally rectangular for receiving a rectangular inner cushion.

15. The body mount of claim 11 wherein the structural collar is generally round for receiving a round inner cushion.

16. The body mount of claim 9 wherein the metal helmet includes a stem which extends through a central axis of the first member and engages the second member.

17. A body mount for coupling a vehicle body to a vehicle frame comprising:

an upper cushion disposed on one side of the frame, the upper cushion having a structural collar with means for forming a lateral cushioning rate, said cushioning means including a first pair of discrete pads formed about the perimeter thereof for defining a side to side lateral cushioning rate of the body mount and a second pair of pads formed about the perimeter thereof for defining a fore and aft lateral cushioning rate of the body mount;

the upper cushion including an inner cushion disposed within the structural collar, the inner cushion defining a vertical cushioning rate of the body mount a helmet fitted over the upper cushion for contacting a portion of the inner cushion and contacting the first and second pairs of pads; and a rebound cushion disposed on an opposite side of the frame and operably coupled to the upper cushion, the rebound cushion includes a clamp disk for maintaining the rebound cushion in contact with the vehicle frame and an annular lip for retaining the clamp disk.

18. The body mount of claim 19 wherein the shape of the inner cushion is selected based on the desired vertical cushioning rate of the body mount.

19. A body mount for coupling a vehicle body to a vehicle frame comprising:

an upper cushion disposed on one side of the frame, the upper cushion having a structural collar with a first pair of pads formed about the perimeter thereof for defining a side to side lateral cushioning rate of the body mount and a second pair of pads formed about the perimeter thereof for defining a fore and aft lateral cushioning rate of the body mount; the upper cushion including an inner cushion disposed within the structural collar, the inner cushion defining a vertical cushioning rate of the body mount;

a metal helmet fitted over the upper cushion for contacting a portion of the inner cushion and contacting the first and second pairs of pads; and a rebound cushion disposed on an opposite side of the frame and operably coupled to the upper cushion, the rebound cushion includes a clamp disk for maintaining the rebound cushion in contact with the vehicle frame and an annular lip for retaining the clamp disk.

* * * * *